S. H. DOSCHER.
CULINARY IMPLEMENT.
APPLICATION FILED JULY 9, 1914.
1,116,035.
Patented Nov. 3, 1914.
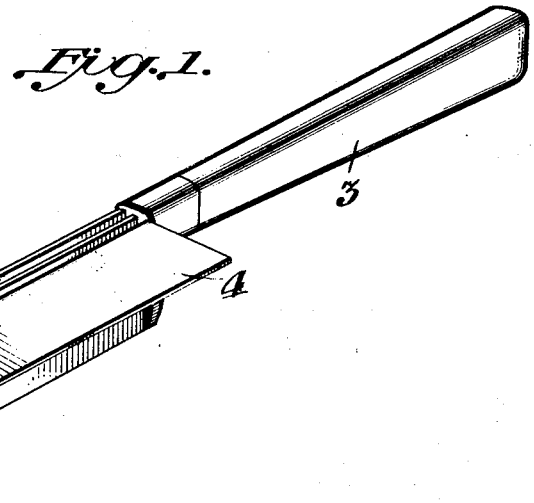
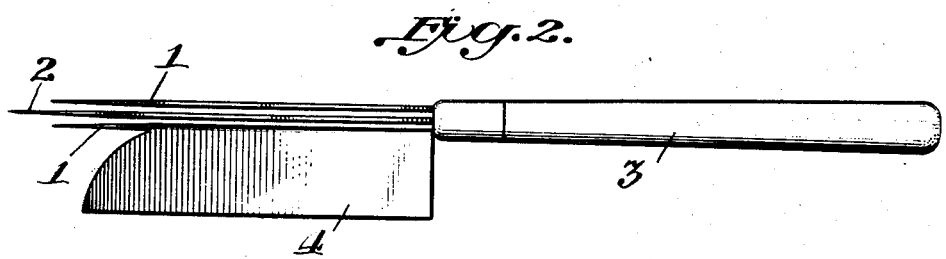
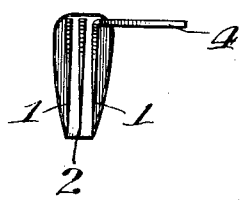

UNITED STATES PATENT OFFICE.

SUSIE H. DOSCHER, OF NEW YORK, N. Y.

CULINARY IMPLEMENT.

1,116,035.   Specification of Letters Patent.   Patented Nov. 3, 1914.

Application filed July 9, 1914. Serial No. 849,946.

*To all whom it may concern:*

Be it known that I, SUSIE H. DOSCHER, a citizen of the United States, residing at New York, in the county of New York and State of New York, have invented certain new and useful Improvements in Culinary Implements; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a culinary implement and specifically to a device for splitting and removing the kernels from the ears of green corn.

Its object is to provide a device for splitting the kernels and removing the pulpy and nutritious portion from the fibrous covering.

A further object is to provide an inexpensive and compact device with which the removal of the pulpy portion of the grain can be quickly and thoroughly accomplished.

With these and other objects in view, the invention consists of certain novel features of construction, combination and arrangement of parts, as will be more fully described and particularly pointed out in the appended claims.

An embodiment of this invention is illustrated in the accompanying drawings, in which—

Figure 1 is a perspective view of the implement; Fig. 2 is a plan view; and Fig. 3 is an end view.

In the drawings the numeral 1 designates a plurality of splitting blades, of which there may be any suitable number. Arranged between the splitting blades 1, and spaced therefrom is a guiding blade 2 which, when positioned between the rows of grains on the cob, causes the splitting knives to engage the center of the adjacent rows of grains. The guiding blade is preferably longer than the splitting blades, as shown in the drawings, so that the implement may be more readily positioned upon the ear for the splitting operation. The splitting blades and the guiding blade are attached to a handle 3 which may be of any suitable shape and material.

Formed integrally with or suitably attached to one of the splitting blades is a scraper 4, which is arranged substantially at a right angle to the splitting blade and projects outwardly therefrom and which serves to give rigidity to both the blade and the scraper.

In the operation of the device, the ear of corn is grasped in one hand; the guiding blade is then inserted between the adjacent rows of grains and the implement drawn lengthwise of the ear so that the splitting blades will split the grains of two adjacent rows. After the grains have been split, the scraper is then presented to the ear at right angles and drawn the length of the ear, so as to press or force the pulpy portion of the grain from the fibrous covering which is left adhering to the cob.

It will be apparent from the foregoing description and operation that the guiding blade will travel between the rows of grains and prevent the splitting blades from being diverted from one row to another. It will also be understood that by forming the splitting blade and scraper in the manner shown and described, each braces the other and serves to make each one rigid.

While the device shown and described consists of two splitting blades and a guiding blade, it is obvious that one or more splitting blades and the scraper may be used and still retain the features of the invention.

Having described my invention and set forth its merits, what I claim is—

1. A culinary implement comprising parallel splitting blades and a non-cutting interposed guiding blade.

2. A culinary implement comprising parallel splitting blades, and a non-cutting interposed guiding blade of greater length than the splitting blades.

3. A culinary implement comprising a splitting blade and a scraper projecting laterally from the upper portion of the splitting blade.

In testimony whereof I affix my signature in presence of two witnesses.

SUSIE H. DOSCHER.

Witnesses:
  HENRY DOSCHER,
  JOHN J. WELSH.